US006312542B1

(12) United States Patent
Nagata et al.

(10) Patent No.: US 6,312,542 B1
(45) Date of Patent: Nov. 6, 2001

(54) FIBROUS ACOUSTICAL MATERIAL FOR REDUCING NOISE TRANSMISSION AND METHOD FOR PRODUCING SAME

(75) Inventors: Makio Nagata, Yamaguchi; Katsumi Morohoshi, Kanagawa; Hiroki Nagayama, Yokohama; Kouichi Nemoto, Kanagawa, all of (JP)

(73) Assignees: Nissan Motor Co., Ltd., Yokohama; Kanebo, Ltd.; Kanebo Gohsen, Ltd., both of Osaka, all of (JP)

( * ) Notice: Subject to any disclaimer, the term of this patent is extended or adjusted under 35 U.S.C. 154(b) by 0 days.

(21) Appl. No.: 09/699,462

(22) Filed: Oct. 31, 2000

Related U.S. Application Data

(62) Division of application No. 09/033,932, filed on Mar. 2, 1998, now Pat. No. 6,155,921.

(30) Foreign Application Priority Data

Mar. 3, 1997 (JP) .................................................... 9-48018

(51) Int. Cl.[7] ..................................................... B32B 29/02

(52) U.S. Cl. .......................... 156/176; 156/180; 156/181; 156/306.3

(58) Field of Search .................................... 264/113, 118, 264/119, 122; 156/176, 180, 181, 306.3

(56) References Cited

U.S. PATENT DOCUMENTS

| | | | | |
|---|---|---|---|---|
| Re. 36,323 | * | 10/1999 | Thompson et al. | 181/286 |
| 4,340,519 | | 7/1982 | Kotera et al. . | |
| 4,551,378 | | 11/1985 | Carey, Jr. . | |
| 5,102,724 | | 4/1992 | Okawahara et al. . | |
| 5,133,835 | | 7/1992 | Goettmann et al. . | |
| 5,646,077 | | 7/1997 | Matsunaga et al. . | |
| 5,817,408 | * | 10/1998 | Orimo et al. | 428/218 |
| 5,851,355 | | 12/1998 | Goettmann . | |
| 6,165,921 | * | 12/2000 | Nagata et al. | 442/415 |

FOREIGN PATENT DOCUMENTS

| | | | |
|---|---|---|---|
| 38 38 247 A1 | | 10/1989 | (DE) . |
| 196 00 979 A1 | | 7/1996 | (DE) . |
| 0 317 646 A1 | | 5/1989 | (EP) . |
| 2 282 829 A | | 4/1995 | (GB) . |
| 07003599 A | | 1/1995 | (JP) . |
| 8188951 A | * | 7/1996 | (JP) . |

* cited by examiner

*Primary Examiner*—Cynthia H. Kelly
*Assistant Examiner*—J. Gray
(74) *Attorney, Agent, or Firm*—McDermott, Will & Emery

(57) ABSTRACT

The invention relates to a fibrous acoustical material for reducing noise transmission. This fibrous acoustical material comprises first, second and third fibers. The first fiber has a first fineness of 1.5–20 deniers and a first softening point. The second fiber has a second fineness of 1.5–15 deniers. At least a surface of the second fiber has a second softening point which is at least 30° C. lower than the first softening point. The third fiber has a third fineness of 1.5–15 deniers. At least a surface of the third fiber has a third softening point which is lower than the second softening point and at least 80° C. lower than the first softening point. The first, second and third fibers are respectively in amounts of 10–90 wt %, 5–85 wt % and 5–85 wt %, based on a total weight of the first, second and third fibers. The first, second and third fibers are each within a range of from 20 to 100 mm in average fiber length. The fibrous acoustical material has an average apparent density of from 0.01 to 0.8 g/cm$^3$. The fibrous acoustical material is light in weight and superior in acoustical capability, heat resistance and resistance to compressive force.

9 Claims, No Drawings

FIBROUS ACOUSTICAL MATERIAL FOR REDUCING NOISE TRANSMISSION AND METHOD FOR PRODUCING SAME

This application is a divisional of application Ser. No. 09/033,932, filed Mar. 2, 1998, Pat. No. 6,155,921.

The contents of Japanese Patent Application Nos. 9-48018, with a filing date of Mar. 3, 1997, are hereby incorporated by reference.

BACKGROUND OF THE INVENTION

The present invention relates to a fibrous acoustical material for reducing noise transmission, such as automotive floor insulator and automotive trunk insulating carpet, and a method for producing the fibrous acoustical material.

Today, there is a demand for the development of an acoustical material that is superior in sound insulating capability. Hitherto, there have been various acoustical materials, such as (i) a felt prepared from regenerated fibers by using a thermosetting binder (e.g., phenolic resin), (ii) a molded felt prepared by using a thermoplastic binder (e.g., polyethylene and polypropylene resins), (iii) another molded felt prepared by adding thermoplastic fibers as a binder, (iv) an acoustical material prepared by heat or cold pressing an inorganic fibrous material (e.g., glass fibers) containing a thermosetting or thermoplastic resin, and (v) a fibrous material prepared at first by mixing principal fibers (e.g., polyester fibers) with binding fibers having a lower melting point than that of the principal fibers and then by heating the resultant mixture in a manner to melt the binding fibers. This fibrous material (v) has widely been used as an acoustical material, due to its relatively high sound insulating capability. If it is required to improve heat resistance of this fibrous material, it is possible to use fibers having a high softening point as the binding fibers. With this, however, the number of contact points, at which the principal and binding fibers are held together as the result of adhesion of the binding fibers to the principal fibers, may become insufficient. This may make the fibrous material inferior in resistance to compressive force in its use as a floor insulator. If the amount of the constituent fibers of the fibrous material is increased in order to make the fibrous material satisfactory in resistance to compressive force, the fibrous material may become too heavy in weight and inferior in acoustical capability due to the increase of dynamic spring constant. Furthermore, if the fineness of the principal fibers is increased, the fibrous material may become inferior in sound absorption capability.

SUMMARY OF THE INVENTION

It is therefore an object of the present invention to provide an acoustical material for reducing noise transmission, which is light in weight and superior in acoustical capability, heat resistance and resistance to compressive force.

It is another object of the present invention to provide a method for producing such an acoustical material in an easy, economical way in an industrial scale.

According to the present invention, there is provided a fibrous acoustical material for reducing noise transmission. This fibrous acoustical material comprises first, second and third fibers. The first fiber has a first fineness of from 1.5 to 20 deniers and a first softening point. The second fiber has a second fineness of from 1.5 to 15 deniers. At least a surface of the second fiber has a second softening point which is at least 30° C. lower than the first softening point. The third fiber has a third fineness of from 1.5 to 15 deniers. At least a surface of the third fiber has a third softening point which is lower than the second softening point and at least 80° C. lower than the first softening point. The first, second and third fibers are respectively in amounts of 10–90 wt %, 5–85 wt % and 5–85 wt %, based on the total weight of the first, second and third fibers. The first, second and third fibers are each within a range of from 20 to 100 mm in average fiber length. The fibrous acoustical material has an average apparent density of from 0.01 to 0.8 g/cm$^3$.

According to the present invention, there is provided a method for producing the fibrous acoustical material. This method comprises the following steps of: (1) preparing a mixture of the first, second and third fibers; (2) piling the mixture to form a web of the mixture; (3) compressing the web into a compressed web; and (4) heating the compressed web at a temperature between the first softening point of the first fiber and the second softening point of the second fiber, thereby to prepare the fibrous acoustical material having a thickness of from 2 to 80 mm.

The above-mentioned fibrous acoustical material according to the present invention is light in weight and superior in acoustical capability, heat resistance and resistance to compressive force. This fibrous acoustical material can be produced by the above-mentioned method in an industrial scale, in an easy, economical way, under a good working environment, with a good recyclability.

DESCRIPTION OF THE PREFERRED EMBODIMENTS

A fibrous acoustical material according to the present invention will be described in detail in the following. As stated above, the fibrous acoustical material comprises the first, second and third fibers and is prepared by heating a web of these fibers at a temperature between the first softening point of the first fiber and the second softening point of the second fiber. Furthermore, the third softening point of the third fiber is lower than the second softening point. Thus, at least the surfaces of the second and third fibers become soft by this heating and adhere to each other and to the first fiber to form contact points among these constituent fibers. These contact points are generally uniformly distributed in the fibrous acoustical material. In the invention, "softening point" of a fiber refers to a temperature at which the fiber becomes soft and thus exhibits adhesiveness. The first fiber may be a mixture of fibers of at least two kinds each having a fineness of from 1.5 to 20 deniers.

As stated above, the first, second and third fibers are respectively in amounts of 10–90 wt %, 5–85 wt % and 5–85 wt %, based on the total weight of the first, second and third fibers. If the amount of the second fiber is less than 5 wt %, the fibrous acoustical material becomes inferior in heat resistance. If the amount of the third fiber is less than 5 wt %, the fibrous acoustical material becomes inferior in resistance to compressive force. If the amount of the first fiber is less than 10 wt %, the total amount of the second and third fibers becomes excessive. With this, the fibrous acoustical material becomes inferior in sound absorption capability. Furthermore, when a web of the first, second and third fibers is prepared, the second and/or third fiber may adhere to a device for preparing the web. This may interfere with the web preparation.

In the invention, the first, second and third fibers may each be made of a fiber-forming thermoplastic polymer or a mixture of at least two of such polymers. Furthermore, each of these fibers may be a fiber prepared by spinning at least two components made of such polymers. Examples of the fiber-forming thermoplastic polymer are homopolyester, copolyester, homopolyamide, copolyamide, homopolyacrylonitrile, copolyacrylonitrile, polyolefin, polyvinyl chloride, polyvinylidene chloride, and polychlal.

In the invention, the first, second and third fibers are not particularly limited in the kind of fiber. In the preparation of the fibrous acoustical material, at least the surface of each of the second and third fibers becomes soft by heating and thus adheres to each other and to the first fiber, thereby to form contact points among the first, second and third fibers. It is preferable to use "compatible polymers" for the first fiber and at least the surface of each of the second and third fibers. For example, when polyamide is used for the first fiber, it is preferable to use a copolyamide, which is compatible with polyamide, for at least the surface of each of the second and third fibers. It is particularly preferable to use polyester-based fibers for the first, second and third fibers, in view of being high in melting point (Tm) of crystal, in strength and in modulus and being relatively cheap in price and being stable in commercial availability.

In the invention, the first fiber is preferably made of a fiber-forming polyester. Herein, the fiber-forming polyester is referred to as a linear polyester having a basic skeleton of polyethylene terephthalate. It is optional to use as the fiber-forming polyester a copolyester which has a softening point of at least 160° C. and is prepared by copolymerizing polyethylene terephthalate with a small amount of at least one substance selected from the group consisting of (i) glycols each being different from ethylene glycol, (ii) dibasic acids each being different from terephthalic acid, and (iii) hydroxycarboxylic acids. As the amount of this at least one substance increases, the first fiber lowers in fiber strength and modulus. Thus, it is the most preferable to use a homopolymer of polyethylene terephthalate as the fiber-forming polyester. Examples of the above-mentioned glycol different from ethylene glycol are trimethylene glycol, tetramethylene glycol, diethylene glycol, pentaerythritol, and bisphenol A. Examples of the above-mentioned dibasic acid are aromatic dicarboxylic acids such as isophthalic acid and naphthalenedicarboxylic acid, fatty acid dicarboxylic acids such as glutaric acid, adipic acid and cyclohexanedicarboxylic acid. An example of the above-mentioned hydroxycarboxylic acid is para-hydroxybenzoic acid.

It is preferable that the above-mentioned at least one substance is added in an amount such that the obtained copolyester has a softening point of at least 160° C., as mentioned above.

In the invention, at least the surface of the second fiber has a second softening point which is at least 30° C. lower than the first softening point of the first fiber, as stated above. In fact, it is preferable that at least the surface of the second fiber is made of a first fiber-forming modified polyester having the second softening point which is 30–100° C. lower than the first softening point of the fiber-forming polyester of the first fiber. A first example of the second fiber is a first core-and-sheath composite fiber having a core portion comprising a second fiber-forming polyester and a sheath portion comprising the first fiber-forming modified polyester. A second example of the second fiber is a first side-by-side composite fiber having a first side portion comprising the second fiber-forming polyester and a second side portion comprising the first fiber-forming modified polyester. In each of the first and second examples of the second fiber, the second softening point of the first fiber-forming modified polyester is further defined as being 30–100° C. lower than a softening point of the second fiber-forming polyester. A third example of the second fiber is a first single component fiber made of the first fiber-forming modified polyester. In contrast to the invention, if the difference between the softening point of the first fiber and that of the surface of the second fiber is less than 30° C., the first fiber, as well as the second and third fibers, may be softened in the heating procedure of the web. Furthermore, if the difference therebetween is greater than 100° C., the softening point of the surface of the second fiber may become too low. With this, the fibrous acoustical material, which is a molded final product, may become soft and thus be deformed in an atmosphere of high temperature.

In the invention, the first fiber-forming modified polyester, which constitutes at least the surface of the second fiber, may be the following first or second example. The first example is a copolymer which has a softening point of from 130 to 200° C. and is prepared by copolymerizing polyethylene terephthalate with a certain desired amount of the above-mentioned at least one substance used in the fiber-forming polyester of the first fiber. The second example is a polymer blend of polyethylene terephthalate with another polyester different from polyethylene terephthalate. If the first fiber-forming modified polyester has a softening point of lower than 130° C., the selection of the material(s) of the third fiber may become substantially limited. Furthermore, the first and/or second fiber may adhere to a device for forming a web of the first, second and third fibers during the formation of this web. This may interfere with the web formation. In contrast, if the first fiber-forming modified polyester has a softening point of higher than 200° C., the selection of the material(s) of the first fiber may become substantially limited. Thus, it is preferable that the first fiber-forming modified polyester has a softening point of from 130 to 200° C.

In the invention, at least the surface of the third fiber has a third softening point which is lower than the second softening point and at least 80° C. lower than the first softening point. In fact, it is preferable that at least the surface of the third fiber is made of a second fiber-forming modified polyester having the third softening point which is lower than the second softening point and 80–150° C. lower than the first softening point. A first example of the third fiber is a second core-and-sheath composite fiber having a core portion comprising the third fiber-forming polyester and a sheath portion comprising the second fiber-forming modified polyester. A second example of the third fiber is a second side-by-side composite fiber having a first side portion comprising the third fiber-forming polyester and a second side portion comprising the second fiber-forming modified polyester. In each of the first and second examples of the third fiber, the third softening point of the second fiber-forming modified polyester is further defined as being 80–150° C. lower than a softening point of the third fiber-forming polyester. A third example of the third fiber is a second single component fiber made of the second fiber-forming modified polyester. In contrast to the invention, if the difference between the first softening point of the first fiber and that of the surface of the third fiber is less than 80° C., it becomes difficult to obtain an advantageous effect of the increase of the contact points of the fibers. Furthermore, if the difference therebetween is greater than 150° C., the softening point of the surface of the third fiber may become too low. With this, the fibrous acoustical material, which is a molded final product, may become soft and thus be deformed in an atmosphere of high temperature, even though the surface of the second fiber has a high softening point.

In the invention, the second fiber-forming modified polyester, which constitutes at least the surface of the third fiber, may be the following first or second example. The first example is a copolymer which has a softening point of from 100 to 170° C. and is prepared by copolymerizing polyethylene terephthalate with a certain desired amount of the above-mentioned at least one substance used in the fiber-forming polyester of the first fiber. The second example is a polymer blend of polyethylene terephthalate with another polyester different from polyethylene terephthalate. It is preferable that the second fiber-forming modified polyester has a softening point which is from 100 to 170° C. and lower than that of the first fiber-forming modified polyester constituting at least the surface of the second fiber.

In the invention, the first fiber has a fineness of from 1.5 to 20 deniers. If it is less than 1.5 deniers, the first fiber itself becomes too light in weight. Thus, the first fibers fly apart by an air jet used in an air layering method for producing webs (this method will be described hereinafter.). This lowers the yield on the web production and makes the working environment worse by the fibrous dust. Furthermore, the degree of entanglement of the first fibers becomes too high. Thus, it becomes insufficient to open (i.e., disentangle) the first fibers which are entangled with each other in a spherical form. With this, the obtained web may become too high in density and may not become uniform in thickness. In contrast, if it is greater than 20 deniers, the ratio of the surface area of the first fiber to the cross section of the first fiber becomes too low. With this, the efficiency of sound energy absorption of the fibrous acoustical material becomes too low. Furthermore, the number of the first fibers per unit volume of the obtained fibrous acoustical material becomes too small, and thus the constituent first, second and third fibers become too low in cohesion to form a fibrous collective body (fibrous acoustical material).

In the invention, each of the second and third fibers has a fineness of from 1.5 to 15 deniers. If it is less than 1.5 deniers, the constituent first, second and third fibers become too low in cohesion to form a fibrous collective body, due to that the second and third fibers are each small in rigidity. Furthermore, there arise the same problems as those of the above-mentioned case wherein the first fiber has a fineness of less than 1.5 deniers. If the fineness of the second fiber is greater than 15 deniers, the number of the second fibers of the fibrous acoustical material becomes too small. With this, it becomes difficult to obtain a sufficient number of the contact points among the constituent fibers. Thus, the fibrous acoustical material becomes inferior in heat resistance, cohesion and moldability. If the fineness of the third fiber is greater than 15 deniers, the number of the third fibers of the fibrous acoustical material becomes too small. With this, it becomes difficult to obtain a sufficient number of the contact points among the constituent fibers. Thus, the fibrous acoustical material becomes inferior in cohesion, moldability and resistance to compressive force.

In the invention, it is preferable that the average fineness of the constituent first, second and third fibers of the fibrous acoustical material is from 1.5 to 15 deniers. With this, the fibrous acoustical material becomes improved in sound absorption efficiency.

In the invention, the first, second and third fibers are each within a range of from 20 to 100 mm in average fiber length. If it is shorter than 20 mm, the number of contact points among the constituent fibers becomes too small. With this, the fibrous acoustical material becomes inferior in cohesion. Furthermore, it becomes difficult to maintain the original molded shape of the fibrous acoustical material. Still furthermore, the constituent fibers may come out of the fibrous acoustical material when it is disposed on a certain position for use (e.g. vehicular and architectural floors) or during its transportation. This may lower the fibrous acoustical material in sound absorption capability. In contrast, if it is longer than 100 mm, the number of contact points among the constituent fibers becomes too large. With this, it may become insufficient to open the fibers in the web preparation. With this, the obtained web may become too high in density and may not become uniform in thickness.

In the invention, the obtained fibrous acoustical material after molding is preferably within a range of from 2 to 80 mm in average thickness. If it is less than 2 mm, the fibrous acoustical material may become inferior in aeration resistance and sound absorption capability. If it is greater than 80 mm, the fibrous acoustical material may become too small in density and thus may become inferior in sound absorption capability.

In the invention, the fibrous acoustical material after molding has an average apparent density of from 0.01 to 0.8 $g/cm^3$. If it is less than 0.01 $g/cm^3$, the number of the constituent fibers in a certain unit volume becomes too small. With this, the fibrous acoustical material becomes inferior in cohesion and too small in aeration resistance. Thus, it is not possible to obtain a sufficient sound absorption capability. In contrast, if it is greater than 0.8 $g/cm^3$, the fibrous acoustical material becomes too high in rigidity and aeration resistance. With this, it is not possible to obtain a sufficient sound absorption capability.

As stated above, a web of the first, second and third fibers is heated at a temperature between the first softening point of the first fiber and the second softening point of the second fiber. Furthermore, the third softening point of the third fiber is lower than the second softening point. Thus, each of the second and third fibers serves as a binder fiber. The fibrous acoustical material has a desired heat resistance due to the use of the second fiber and a sufficient number of the contact points among the constituent fibers due to the use of the third fiber. In other words, the fibrous acoustical material becomes superior in both of heat resistance and resistance to compressive force, due to the use to the second and third fibers.

A method for producing the fibrous acoustical material according to the invention will be described, as follows. At first, there are provided the first, second and third fibers, each having a certain desired fiber length and fineness and being in the form of, for example, staple cotton, fleece, or lap. Then, these fibers are each opened or disentangled. Then, the opened first, second and third fibers are mixed together by certain desired amounts. Then, a web of these fibers are prepared by a card layering method or an air layering method. In the card layering method, these fibers are put on a belt conveyer to have a thickness of about 5 mm. This is repeated certain times to have a certain desired total thickness, for example, of about 50 mm. In the air layering method, these fibers are allowed to fall by gravity to have a certain desired thickness, without using a belt conveyer. The card layering method is superior to the air layering method in workability. The obtained web is compressed or needle-punched to have certain desired apparent density and thickness. Then, the resultant web is subjected to a hot air or steam having a certain desired temperature, thereby to mold the same and thus produce the fibrous acoustical material. In the invention, it is optional to attach an outer surface layer made of, for example, tricot, nonwoven fabric or woven fabric, to at least one surface of the fibrous acoustical material.

The following nonlimitative examples are illustrative of the present invention.

EXAMPLE 1

At first, a staple mixture was prepared by mixing 70 wt % of a first fiber, 20 wt % of a second fiber, and 10 wt % of a third fiber. Each of the first, second and third fibers had an average fiber length of 51 mm. The first fiber had a fineness of 6 deniers and a softening point of 240° C. and was made of polyethylene terephthalate (PET). The second fiber had a fineness of 2 deniers and was a core-and-sheath composite fiber having a core portion made of PET and a sheath portion made of a copolyester (amorphous polyester) having a softening point of 170° C. The third fiber was the same as the second fiber, except in that the sheath portion was made of another copolymerized polyester (amorphous polyester) having a softening point of 110° C. Then, a web was formed from the obtained staple mixture by the above-mentioned card layering method. Then, this web was compressed to have a certain predetermined thickness. Then, the compressed web was heated at 215° C., thereby to obtain a fibrous acoustical material (polyester fiber collective body) having an average apparent density of 0.025 g/cm$^3$ and a thickness of 35 mm.

EXAMPLE 2

In this example, Example 1 was repeated except in that the average fiber length of each of the first, second and third fibers was 20 mm.

EXAMPLE 3

In this example, Example 1 was repeated except in that the average fiber length of each of the first, second and third fibers was 100 mm.

EXAMPLE 4

In this example, Example 1 was repeated except in that there was prepared a fibrous acoustical material having an average apparent density of 0.01 g/cm$^3$ and a thickness of 44 mm.

EXAMPLE 5

In this example, Example 1 was repeated except in that there was prepared a fibrous acoustical material having an average apparent density of 0.8 g/cm$^3$.

EXAMPLE 6

In this example, Example 1 was repeated except in that there was prepared a fibrous acoustical material having an average apparent density of 0.22 g/cm$^3$ and a thickness of 2 mm.

EXAMPLE 7

In this example, Example 1 was repeated except in that there was prepared a fibrous acoustical material having a thickness of 80 mm.

EXAMPLE 8

In this example, Example 1 was repeated except in that the sheath portion of the third fiber was modified to have a softening point of 100° C.

EXAMPLE 9

In this example, Example 1 was repeated except in that the sheath portion of the third fiber was modified to have a softening point of 150° C.

EXAMPLE 10

In this example, Example 1 was repeated except in that the third fiber was modified to have a fineness of 1.5 deniers.

EXAMPLE 11

In this example, Example 1 was repeated except in that the third fiber was modified to have a fineness of 15 deniers.

EXAMPLE 12

In this example, Example 1 was repeated except in that the second and third fibers were respectively in amounts of 25 wt % and 5 wt %.

EXAMPLE 13

In this example, Example 1 was repeated except in that the first, second and third fibers were respectively in amounts of 10 wt %, 5 wt % and 85 wt %.

EXAMPLE 14

In this example, Example 1 was repeated except in that the sheath portion of the second fiber was modified to have a softening point of 150° C. and that the heating temperature for molding the fibrous acoustical material was 195° C.

EXAMPLE 15

In this example, Example 1 was repeated except in that the sheath portion of the second fiber was modified to have a softening point of 200° C. and that the heating temperature for molding the fibrous acoustical material was 230° C.

EXAMPLE 16

In this example, Example 1 was repeated except in that the second fiber was modified to have a fineness of 1.5 deniers.

EXAMPLE 17

In this example, Example 1 was repeated except in that the second fiber was modified to have a fineness of 15 deniers.

EXAMPLE 18

In this example, Example 1 was repeated except in that the second and third fibers were respectively in amounts of 5 wt % and 25 wt %.

EXAMPLE 19

In this example, Example 1 was repeated except in that the first, second and third fibers were respectively in amounts of 10 wt %, 85 wt % and 5 wt %.

EXAMPLE 20

In this example, Example 1 was repeated except in that the first fiber was modified to have a fineness of 1.5 deniers.

EXAMPLE 21

In this example, Example 1 was repeated except in that the first fiber was modified to have a fineness of 20 deniers.

EXAMPLE 22

In this example, Example 1 was repeated except in that the first, second and third fibers were respectively in amounts of 90 wt %, 5 wt % and 5 wt %.

EXAMPLE 23

In this example, Example 1 was repeated except in that the first fiber was prepared by mixing 30 wt % of a first fiber A having a fineness of 13 deniers with 40 wt % of a first fiber B having a fineness of 6 deniers.

EXAMPLE 24

In this example, Example 1 was repeated except in that the web was formed by an air layering method.

REFERENTIAL EXAMPLE

In this referential example, a fibrous acoustical material (felt) was prepared from a regenerated fiber having an average apparent density of 0.06 g/cm$^3$ and a thickness of 35 mm by using a phenolic resin as binding resin.

COMPARATIVE EXAMPLE 1

In this comparative example, Example 1 was repeated except in that the average fiber length of each of the first, second and third fibers was 15 mm.

COMPARATIVE EXAMPLE 2

In this comparative example, it was tried to prepare a fibrous acoustical material in accordance with Example 1 except in that the average fiber length of each of the first, second and third fibers was 120 mm. However, the first, second and third fibers were strongly entangled with each other. Therefore, it was not possible to open these fibers, and thus the fibrous acoustical material could not be prepared.

COMPARATIVE EXAMPLE 3

In this comparative example, Example 1 was repeated except in that there was prepared a fibrous acoustical material having an average apparent density of 0.008 g/cm$^3$ and a thickness of 55 mm.

COMPARATIVE EXAMPLE 4

In this comparative example, Example 1 was repeated except in that there was prepared a fibrous acoustical material having an average apparent density of 0.9 g/cm$^3$ and a thickness of 5 mm.

COMPARATIVE EXAMPLE 5

In this comparative example, Example 1 was repeated except in that there was prepared a fibrous acoustical material having an average apparent density of 0.44 g/cm$^3$ and a thickness of 1 mm.

COMPARATIVE EXAMPLE 6

In this comparative example, Example 1 was repeated except in that there was prepared a fibrous acoustical material having an average apparent density of 0.01 g/cm$^3$ and a thickness of 100 mm.

COMPARATIVE EXAMPLE 7

In this comparative example, Example 1 was repeated except in that the sheath portion of the third fiber was modified to have a softening point of 90° C.

COMPARATIVE EXAMPLE 8

In this comparative example, Example 1 was repeated except in that the sheath portion of the third fiber was modified to have a softening point of 190° C.

COMPARATIVE EXAMPLE 9

In this comparative example, Example 1 was repeated except in that the third fiber was modified to have a fineness of 1 denier.

COMPARATIVE EXAMPLE 10

In this comparative example, Example 1 was repeated except in that the third fiber was modified to have a fineness of 20 deniers.

COMPARATIVE EXAMPLE 11

In this comparative example, Example 1 was repeated except in that the second and third fibers were respectively in amounts of 28 wt % and 2 wt %.

COMPARATIVE EXAMPLE 12

In this comparative example, Example 1 was repeated except in that the first, second and third fibers were respectively in amounts of 5 wt %, 5 wt % and 90 wt %.

COMPARATIVE EXAMPLE 13

In this comparative example, Example 1 was repeated except in that the sheath portion of the second fiber was modified to have a softening point of 130° C. and that the heating temperature for molding the fibrous acoustical material was 175° C.

COMPARATIVE EXAMPLE 14

In this comparative example, Example 1 was repeated except in that the sheath portion of the third fiber was modified to have a softening point of 215° C. and that the heating temperature for molding the fibrous acoustical material was 240° C.

COMPARATIVE EXAMPLE 15

In this comparative example, Example 1 was repeated except in that the second fiber was modified to have a fineness of 1 denier.

COMPARATIVE EXAMPLE 16

In this comparative example, Example 1 was repeated except in that the second fiber was modified to have a fineness of 20 deniers.

COMPARATIVE EXAMPLE 17

In this comparative example, Example 1 was repeated except in that the second and third fibers were respectively in amounts of 2 wt % and 28 wt %.

COMPARATIVE EXAMPLE 18

In this comparative example, Example 1 was repeated except in that the first, second and third fibers were respectively in amounts of 5 wt %, 90 wt % and 5 wt %.

COMPARATIVE EXAMPLE 19

In this comparative example, Example 1 was repeated except in that the first fiber was modified to have a fineness of 1 denier.

COMPARATIVE EXAMPLE 20

In this comparative example, Example 1 was repeated except in that the first fiber was modified to have a fineness of 30 deniers.

Evaluation Tests

The fibrous acoustical materials according to Examples 1–24, Referential Example, and Comparative Examples 1 and 3–20 were subjected to the following evaluation tests. The results of these tests are shown in Table. With respect to the test results of each of the following cohesion test, compressive force resistance test, heat resistance test, and dynamic spring constant test, "A" means that the result was substantially superior to that of Referential Example, "B" means that the result was superior to that of Referential Example, "C" means that the result was similar to that of Referential Example, and "D" means that the result was inferior to that of Referential Example. Thus, each of these test results of the fibrous acoustical material according to Referential Example was evaluated as "C", as shown in Table. The fibrous acoustical material according to Comparative Example 3 was subjected to only the following cohesion test, fibrous dust test, compressive force resistance test (see Table).

In the cohesion test, there was evaluated the degree of cohesion of the constituent first, second and third fibers to form a fibrous collective body.

In the fibrous dust test, there was checked the occurrence of fibrous dust to such an extent that the working environment becomes substantially inferior during the preparation of the fibrous acoustical material.

In the sound absorption capability test, normal incident sound absorption coefficient of the fibrous acoustical material having a diameter of 100 mm was measured within a range of from 125 to 1,600 Hz in accordance with Japanese Industrial Standard (JIS) A 1405.

In the compressive force resistance test, a compressive element having a weight of 10 kg and a bottom surface diameter of 150 mm was placed on the fibrous acoustical material. Then, the degree of sinkage of the compressive element was measured.

In the heat resistance test, the fibrous acoustical material having widths of 100 mm was heated on a hot plate having a temperature of 150° C. During this heating, the side surface of the fibrous acoustical material was kept covered with a heat insulating material. Then, the thickness change of the fibrous acoustical material before and after the heating was measured.

In the dynamic spring constant test, resonance frequency of the fibrous acoustical material was determined by a forced vibration thereof. Then, the dynamic spring constant (k) was found by the following expression:

$$k=4\pi^2 \cdot f^2 \cdot m$$

where f is resonance frequency of the fibrous acoustical material, and m is mass of the same.

TABLE

| | Cohesion | Occurrence of Fibrous Dust | Sound Absorption Coef. 500 Hz | Sound Absorption Coef. 1000 Hz | Res. to Compressive Force | Heat Res. | Dynamic Spring Constant |
|---|---|---|---|---|---|---|---|
| Ex. 1 | B | No | 0.21 | 0.42 | B | B | B |
| Ex. 2 | B | No | 0.21 | 0.43 | B | B | B |
| Ex. 3 | B | No | 0.21 | 0.42 | B | B | B |
| Ex. 4 | B | No | 0.30 | 0.53 | B | B | B |
| Ex. 5 | B | No | 0.26 | 0.52 | A | A | B |
| Ex. 6 | A | No | 0.10 | 0.29 | A | A | C |
| Ex. 7 | B | No | 0.42 | 0.69 | B | B | B |
| Ex. 8 | B | No | 0.20 | 0.42 | B | B | B |
| Ex. 9 | B | No | 0.23 | 0.44 | B | A | B |
| Ex. 10 | B | No | 0.28 | 0.48 | B | B | B |
| Ex. 11 | B | No | 0.17 | 0.34 | B | B | B |
| Ex. 12 | B | No | 0.23 | 0.43 | B | C | B |
| Ex. 13 | B | No | 0.37 | 0.51 | A | B | C |
| Ex. 14 | B | No | 0.20 | 0.42 | B | A | B |
| Ex. 15 | B | No | 0.21 | 0.42 | B | B | B |
| Ex. 16 | B | No | 0.26 | 0.51 | B | B | B |
| Ex. 17 | B | No | 0.15 | 0.33 | B | B | B |
| Ex. 18 | B | No | 0.24 | 0.40 | B | A | B |
| Ex. 19 | B | No | 0.39 | 0.53 | A | B | C |
| Ex. 20 | C | No | 0.41 | 0.70 | C | B | A |
| Ex. 21 | B | No | 0.17 | 0.44 | B | B | B |
| Ex. 22 | B | No | 0.23 | 0.44 | C | C | A |
| Ex. 23 | B | No | 0.18 | 0.39 | B | B | B |
| Ex. 24 | B | No | 0.24 | 0.47 | B | B | B |
| Ref. Ex. | C | Yes | 0.04 | 0.25 | C | C | C |
| Com. Ex. 1 | D | Yes | 0.20 | 0.40 | D | B | B |
| Com. Ex. 2 | — | — | — | — | — | — | — |
| Com. Ex. 3 | D | No | — | — | D | — | — |
| Com. Ex. 4 | A | No | 0.40 | 0.69 | A | B | D |
| Com. Ex. 5 | A | No | 0.09 | 0.20 | A | B | D |
| Com. Ex. 6 | D | No | 0.46 | 0.74 | D | B | A |
| Com. Ex. 7 | B | No | 0.20 | 0.43 | B | D | B |
| Com. Ex. 8 | B | No | 0.24 | 0.46 | D | A | B |
| Com. Ex. 9 | C | Yes | 0.30 | 0.47 | D | B | B |
| Com. Ex. 10 | B | No | 0.13 | 0.26 | D | D | B |
| Com. Ex. 11 | B | No | 0.25 | 0.47 | D | B | B |
| Com. Ex. 12 | B | No | 0.39 | 0.53 | A | D | D |
| Com. Ex. 13 | B | No | 0.21 | 0.40 | B | D | B |
| Com. Ex. 14 | B | No | 0.20 | 0.43 | A | B | D |

TABLE-continued

| | Cohesion | Occurrence of Fibrous Dust | Sound Absorption Coef. 500 Hz | Sound Absorption Coef. 1000 Hz | Res. to Compressive Force | Heat Res. | Dynamic Spring Constant |
|---|---|---|---|---|---|---|---|
| Com. Ex. 15 | C | Yes | 0.22 | 0.42 | C | D | B |
| Com. Ex. 16 | B | No | 0.22 | 0.40 | C | D | B |
| Com. Ex. 17 | B | No | 0.25 | 0.43 | A | D | C |
| Com. Ex. 18 | B | No | 0.42 | 0.66 | A | A | D |
| Com. Ex. 19 | D | Yes | 0.49 | 0.72 | D | C | A |
| Com. Ex. 20 | B | No | 0.13 | 0.25 | A | B | D |

What is claimed is:

1. A method for producing a fibrous acoustical material for reducing noise transmission, said fibrous acoustical material comprising:

(a) a first fiber having a first fineness of from 1.5 to 20 deniers and a first softening point;

(b) a second fiber having a second fineness of from 1.5 to 15 deniers, at least a surface of said second fiber having a second softening point which is at least 30° C. lower than said first softening point by; and (c) a third fiber having a third fineness of from 1.5 to 15 deniers, at least a surface of said third fiber having a third softening point which is lower than said second softening point and at least 80° C. lower than said first softening point, wherein said first, second and third fibers are respectively in amounts of 10–90 wt %, 5–85 wt % and 5–85 wt %, based on a total weight of said first, second and third fibers, wherein said first, second and third fibers are each within a range of from 20 to 100 mm in average fiber length, wherein said fibrous acoustical material has an average apparent density of from 0.01 to 0.8 g/$cm^3$, said method comprising the following steps of:

(1) preparing a mixture of said first, second and third fibers;

(2) piling said mixture to form a web of said mixture;

(3) compressing said web into a compressed web; and (4) heating said compressed web at a temperature between said first softening point of said first fiber and said second softening point of said second fiber, thereby to prepare said fibrous acoustical material having a thickness of from 2 to 80 mm.

2. A method according to claim 1, wherein said first fiber comprises a first fiber-forming polyester having said first softening point, wherein said second fiber comprises a first fiber-forming modified polyester having said second softening point which is 30–100° C. lower than said first softening point, and wherein said third fiber comprises a second fiber-forming modified polyester having said third softening point which is lower than said second softening point and 80–150° C. lower than said first softening point.

3. A method according to claim 2, wherein said second and third fibers further comprise second and third fiber-forming polyesters, respectively.

4. A method according to claim 3, wherein said second fiber is a first core-and-sheath composite fiber having a core portion comprising said second fiber-forming polyester and a sheath portion comprising said first fiber-forming modified polyester having said second softening point which is 30–100° C. lower than a softening point of said second fiber-forming polyester, and wherein said third fiber is a second core-and-sheath composite fiber having a core portion comprising said third fiber-forming polyester and a sheath portion comprising said second fiber-forming modified polyester having said third softening point which is 80–150° C. lower than a softening point of said third fiber-forming polyester.

5. A method according to claim 3, wherein said second fiber is a first side-by-side composite fiber having a first side portion comprising said second fiber-forming polyester and a second side portion comprising said first fiber-forming modified polyester having said second softening point which is 30–100° C. lower than a softening point of said second fiber-forming polyester, and wherein said third fiber is a second side-by-side composite fiber having a first side portion comprising said third fiber-forming polyester and a second side portion comprising said second fiber-forming modified polyester having said third softening point which is 80–150° C. lower than a softening point of said third fiber-forming polyester.

6. A method according to claim 3, wherein said first, second and third fiber-forming polyesters of said first, second and third fibers are each polyethylene terephthalate.

7. A method according to claim 2, wherein said second fiber is a first single component fiber made of said first fiber-forming modified polyester, and wherein said third fiber is a second single component fiber made of said second fiber-forming modified polyester.

8. A method according to claim 3, wherein said first and second fiber-forming modified polyesters of said second and third fibers are respectively first and second copolymers each prepared by copolymerizing polyethylene terephthalate with at least one substance selected from the group consisting of (i) glycols each being different from ethylene glycol, (ii) dibasic acid each being different from terephthalic acid, and (iii) hydroxycarboxylic acids, wherein said first copolymer has said second softening point which is from 130 to 200° C., and wherein said second copolymer has said third softening point which is from 100 to 170° C.

9. A method according to claim 1, wherein the average fineness of the first, second and third fibers is from 1.5 to 15 deniers.

* * * * *

UNITED STATES PATENT AND TRADEMARK OFFICE

CERTIFICATE OF CORRECTION

PATENT NO. : 6,312,542 B1
DATED : November 6, 2001
INVENTOR(S) : Makio Nagata et al.

It is certified that error appears in the above-identified patent and that said Letters Patent is hereby corrected as shown below:

Title page,
Item [62], Related U.S. Application Data, change "Pat. No. 6,155,921" to -- Pat. No. 6,165,921 --.

Signed and Sealed this

Twenty-sixth Day of March, 2002

*Attest:*

JAMES E. ROGAN
*Director of the United States Patent and Trademark Office*

*Attesting Officer*